United States Patent [19]

Montasham et al.

[11] Patent Number: 5,183,094
[45] Date of Patent: Feb. 2, 1993

[54] SUN SHIELD ASSEMBLY

[76] Inventors: Mani Montasham; Hamid Gharagozloo, both of 7896 SW. 106 Cir., Miami, Fla. 33173

[21] Appl. No.: 808,172

[22] Filed: Dec. 13, 1991

[51] Int. Cl.$^5$ .............................................. B60J 3/00
[52] U.S. Cl. .................... 160/370.2; 296/97.7
[58] Field of Search ............... 160/370.2, 368.1; 296/97.7, 97.8

[56] References Cited

U.S. PATENT DOCUMENTS

| | | | |
|---|---|---|---|
| 2,596,836 | 5/1952 | Bruhl | 160/370.2 |
| 2,614,630 | 10/1952 | Moszelt | 160/370.2 |
| 2,646,118 | 7/1953 | Berty | 160/370.2 X |
| 2,944,601 | 7/1960 | Compson | 160/370.2 |
| 3,068,046 | 12/1962 | Bourgoin | 160/370.2 X |
| 3,184,264 | 5/1965 | Ealey et al. | 160/370.2 X |
| 3,338,293 | 8/1967 | Hohmann | 160/370.2 |
| 3,751,100 | 8/1973 | Keyas | 160/370.2 X |
| 4,790,591 | 12/1988 | Miller | 160/370.2 |
| 4,893,668 | 1/1990 | Nomura | 160/368.1 X |
| 5,064,239 | 11/1991 | Folcik | 160/370.2 X |

Primary Examiner—Blair M. Johnson
Attorney, Agent, or Firm—Malloy, Downey & Malloy

[57] ABSTRACT

A sun shield assembly, to be used as an interior cover of a vehicle window such that the interior of the vehicle is protected from direct sunlight, the sun shield including a flexible, opaque material panel, sized and configured to substantially cover the interior surface of the window, a plurality of adjustably positioned suction cups positioned at a plurality of locations about the periphery of the panel so as to enable the panel to securely engage the interior surface of windows of a variety of sizes and configurations, and a plurality of slits cut into the panel, structured and disposed to allow the rear view mirror of the vehicle to pass therethrough.

5 Claims, 5 Drawing Sheets

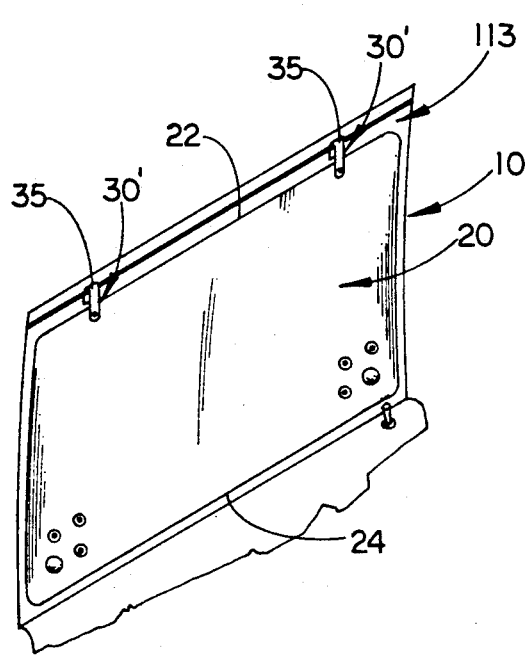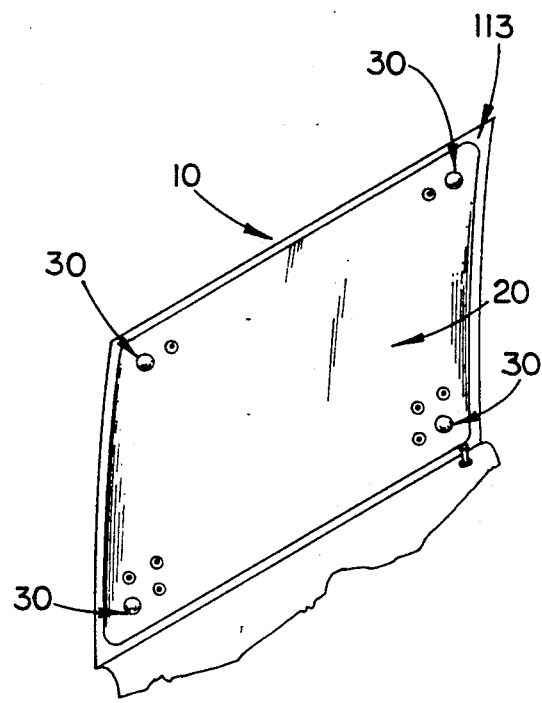
FIG 1c
FIG 1d

SUN SHIELD ASSEMBLY

BACKGROUND OF THE INVENTION

1. Field of the Invention

This invention relates to a sun shield assembly adapted to be quickly and adjustably affixed to an interior surface of vehicle windows of a variety of sizes and configurations, thereby providing an effective, removable, uncumbersome, and easy to use means of protecting the interior of a vehicle from the harmful effects of direct sunlight.

2. Description of the Prior Art

A common aesthetic difficulty that car owners are increasingly facing involves the harmful effects of direct sunlight upon the interior of a vehicle. Most vehicles, which must by necessity be parked outside for a majority of the daylight hours, are constantly under the effects of direct sunlight. As a result, the interiors of these vehicles become very hot, and after prolonged periods of exposure may become discolored or deformed as a result of the sunlight. Accordingly, it is necessary to provide an effective and easy to use means of protecting the interior of a vehicle completely and conveniently. Further, it is necessary that the protective means be easily and completely removable and storable, so as to remove vision obstructions.

In the past, there have been other attempts to solve this problem. The most commonly employed types of sun blocking apparatus are foldable sheets of corrugated cardboard which are propped up against the front windshield of a vehicle. Unfortunately, these devices are highly cumbersome, do not readily remain in contact with the window surface so as to provide complete and constant protection of the interior of the vehicle from the sun, and are bulky when removed so as to make them difficult to store. Further attempts to provide a sun blocking apparatus include retractable rolls of material secured to the interior windshield surface, whereby the material may be pulled out and unrolled to cover a portion of the window. Unfortunately, this apparatus is designed to remain secure to the window and thereby provides a vision obstruction during driving when the article is not in use. Additionally, the strip of material does not fully cover the interior window surface and must be positioned so as to avoid coming into contact with the rear view mirror, thereby further reducing its coverage area. Finally, other decorative designs of sun blocking assemblies have been devised, but as with the prior referenced articles, they are cumbersome and easy to completely remove, do not completely cover the entire window surface, are not adaptable to vehicles of differing sizes, and cannot be easily stored.

Applicant's invention is designed to specifically overcome the shortcomings of the prior art. Applicant's design completely covers the entire window surface, is adaptable for use on vehicles having windows of varying sizes, is easily removed and completely storable, and does not cover a lesser area as the result of the presence of a rear view mirror or like article. As a result, it is distinct over the prior art and provides a more complete and convenient solution to a longstanding problem.

SUMMARY OF THE INVENTION

The present invention is directed towards a sun shield assembly to be used to protect the interior of a vehicle from direct sunlight. The sun shield assembly includes a flexible, opaque material panel structured and disposed to cover an interior window surface of the vehicle. Included on the material panel, are attachment means disposed along the upper and lower periphery of the generally rectangular panel. The attachment means are easily adjustable into a plurality of positions, thereby enabling the panel to be utilized on windows of varying sizes. Finally, as a result of the composition of the panel, the assembly may be compactly stored.

It is an object of the present invention to provide an effective means of protecting the interior vehicle from direct sunlight by completely blocking sunlight passing through the windows of the vehicle.

It is yet another object of the present invention to provide a sun shield assembly which may be utilized on all windows of a vehicle, and on vehicles of varying sizes and orientations.

Finally, it is an object of the present invention to provide a sun shield assembly which is completely removable and compactly stored.

BRIEF DESCRIPTION OF THE DRAWINGS

For a fuller understanding of the nature of the present invention, reference should be had to the following detailed description taken in connection with the accompanying drawings, in which:

FIG. 1C is a perspective view of a sun shield assembly attached to a side window utilizing alternative attachment means.

FIG. 1D is a perspective view of a sun shield assembly secured to a side window.

Like reference numerals refer to like parts throughout the several views of the drawings.

DETAILED DESCRIPTION OF THE PREFERRED EMBODIMENT

Figure 1:
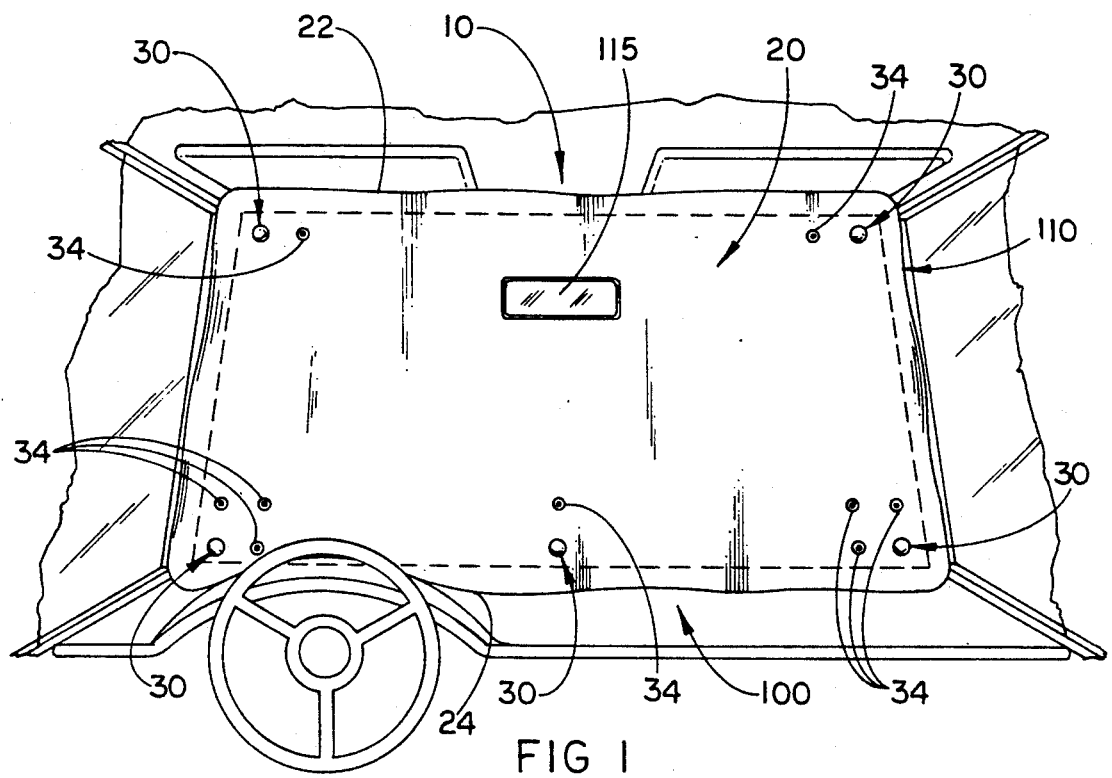
FIG. 1 is a perspective view of an attached sun shield assembly from the interior of a vehicle.
Figure 2:
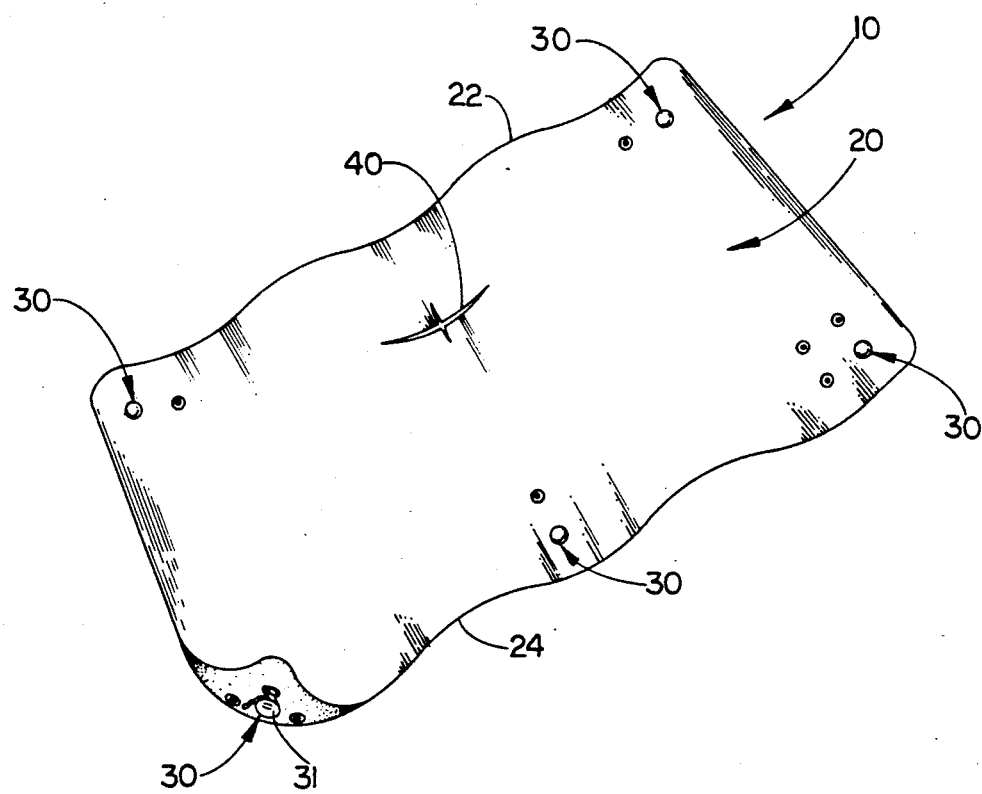
FIG. 2 is a perspective view of the sun shield assembly.

As shown throughout FIGS. 1-7, the present invention is directed towards a sun shield assembly, generally indicated as 10. As shown in FIG. 1, the sun shield assembly 10 is designed to completely cover a vehicle window 110, thereby protecting the interior of the vehicle 100 from exposure to direct sunlight. The sun shield assembly 10, as detailed in FIGS. 1 and 2, includes a flexible, opaque material panel 20 including an upper edge 22 and a lower edge 24. The panel 20 which is sized and configured to completely cover a windshield 110 includes a plurality of attachment means 30 along the upper and lower portions 22 and 24 of the panel 20, thereby enabling the panel 20 to be secured to the windshield 110. Further included in the panel 20 are a plurality of cutout slits 40 structured and disposed to allow receipt therethrough of a rear view mirror 115, so as to allow the panel 20 to remain in complete covering relation over the windshield 110.

Figure 1A:
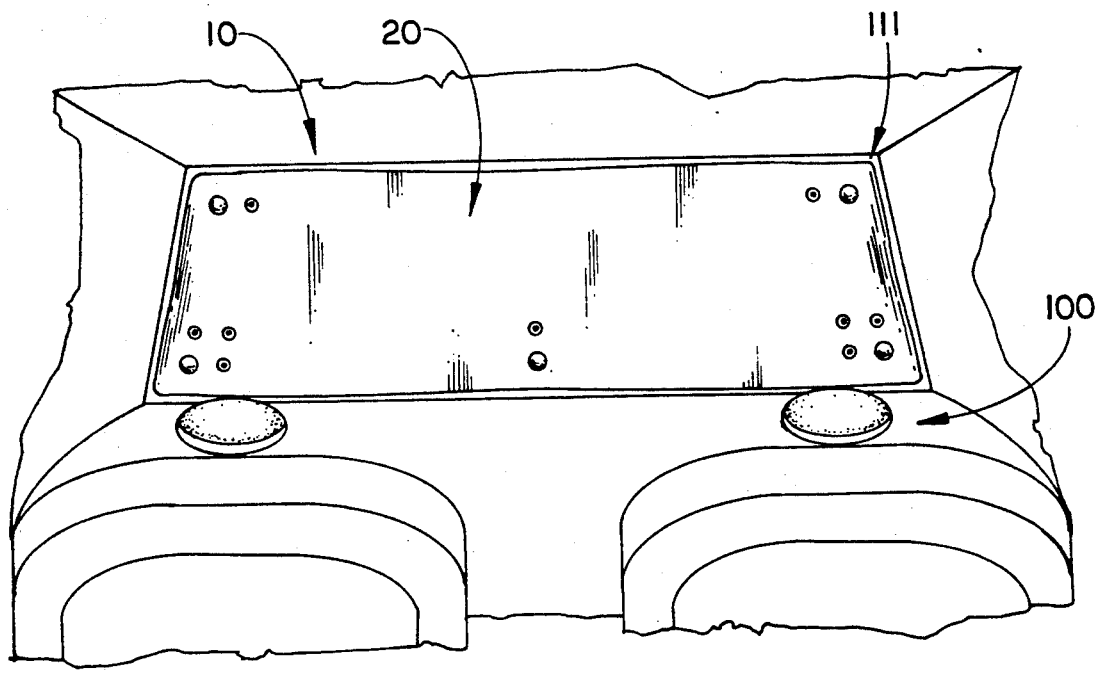
FIG. 1A is a perspective view of an attached sun shield assembly on a rear window.
Figure 1B:
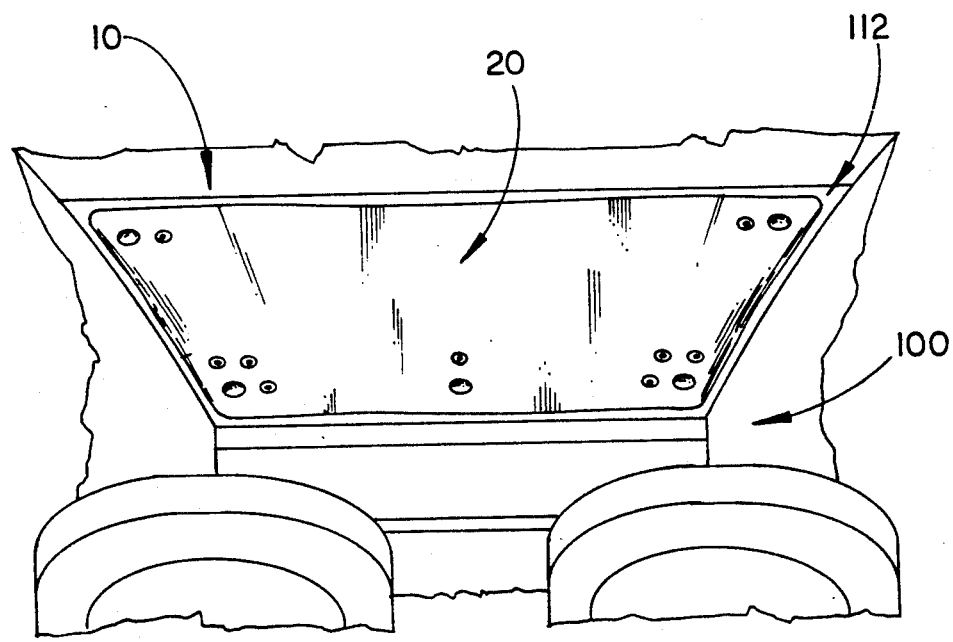
FIG. 1B is a perspective view of an attached sun shield assembly on a hatchback window.

Referring to FIGS. 1A and 1B, the sun shield assembly 10 may also be effectively utilized to cover a rear window 111 or a hatchback window 112. Further, as detailed in FIGS. 1C and 1D, the sun shield assembly 10 may also be utilized on the side window 113 of a vehicle. As specifically shown in FIG. 1C, alternative attachment means 30' may also be utilized along the upper portion 22 of the panel 20. The alternative attachment means 30' includes a pair of hooks 35 structured and disposed to hook over the top edge of the side window 113, thereby maintaining the panel 20 properly positioned over the side window 113.

Figure 3:
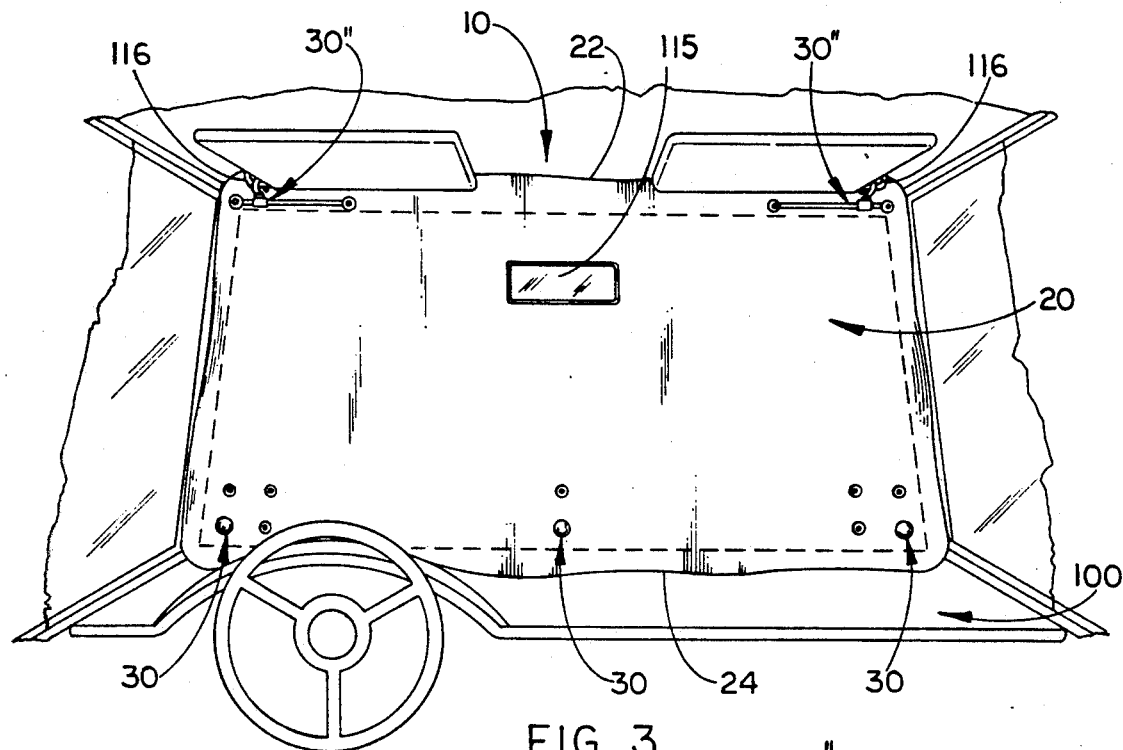
FIG. 3 is a perspective view of an attached sun shield assembly utilizing alternative attachment means.
Figure 4:
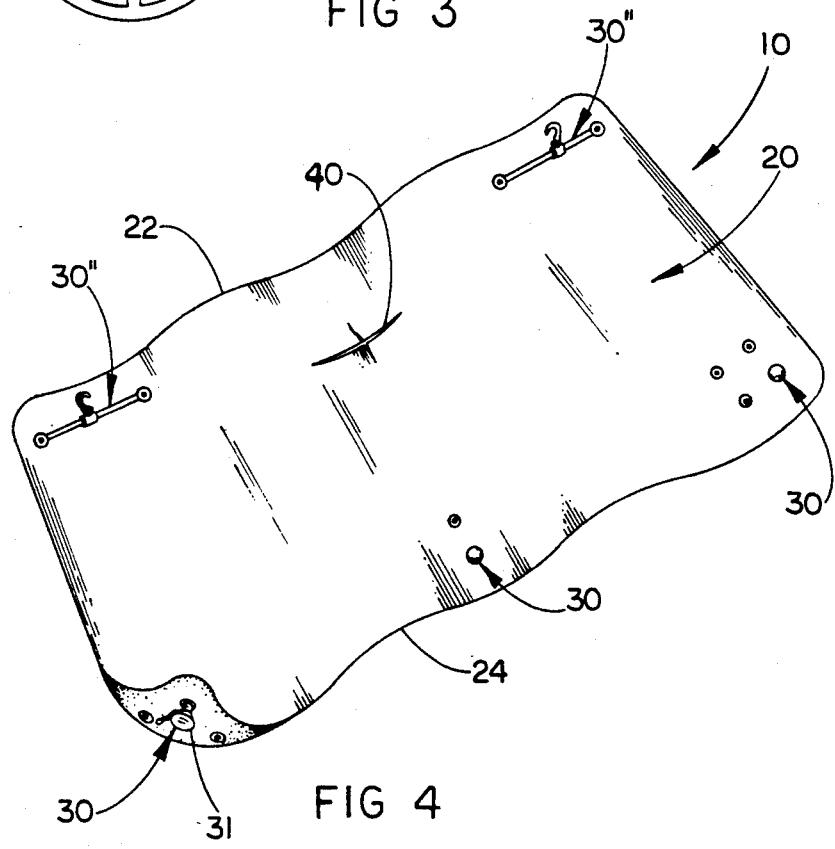
FIG. 4 is a perspective view of the sun shield assembly including the alternative attachment means.

Shown in FIGS. 3 and 4, the sun shield assembly 10 when positioned in covering relation over the windshield 110 may utilize alternative attachment means 30". These alternative attachment means 30" are positioned along the top portion 22 of the panel 20 and are structured and disposed to hook over the vehicle sun visor attachment arms 116. As best detailed in FIG. 6, the alternative attachment means 30" includes an elongate bar 37 fixedly attached at opposite distal ends thereof to the panel 20. Slidably positioned over the bar 37 is a slidable and swivelable hook portion 36. The hook portion 36 is hingedly secured to a cylinder 36' engaged in a slidable position over the bar 37 so as to allow adjustment of the attachment means 30" for use with vehicles of varying sizes and configurations.

Figure 5:
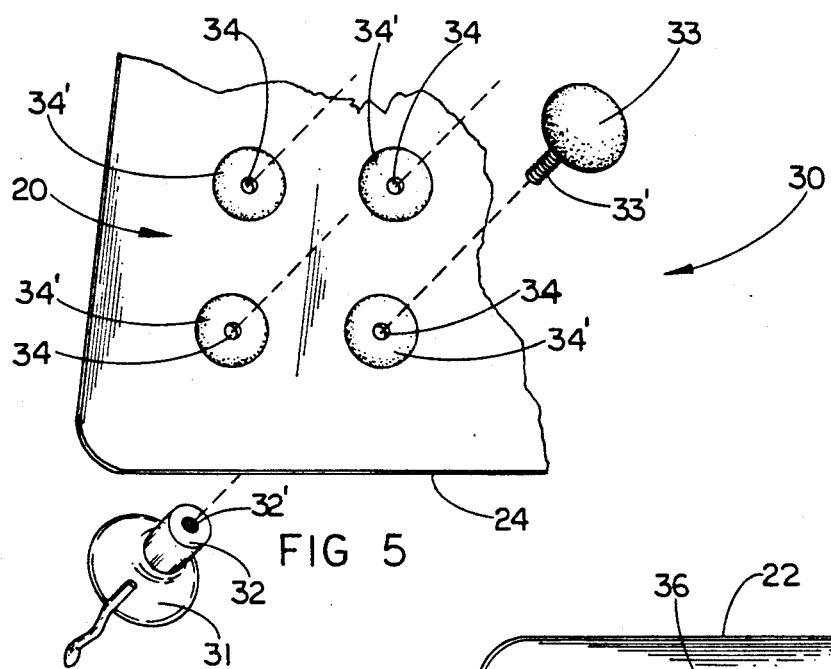
FIG. 5 is an exploded view of a first embodiment of the attachment means.
Figure 6:
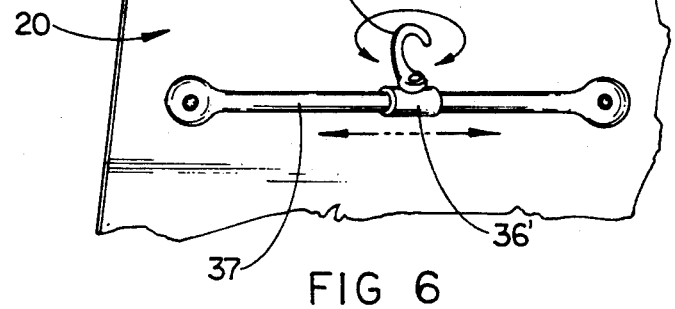
FIG. 6 is a closeup view of a second embodiment of the attachment means.

Referring to FIG. 5, the standard attachment means 30 primarily include a suction cup 31. The suction cup 31 includes a shaft portion 32 having a threaded hollow bore 32' therein. The threaded hollow bore 32' is structured and disposed to receive therein a threaded protruding portion 33' of a screw cap 33. The screw cap 33 is structured and disposed such that the protruding portion 33' may pass through one of a plurality of openings 34 and securely be engaged within the shaft portion 32 of the suction cup 31. There are a plurality of the openings 34 so as to allow adjustable fastening of the attachment means 30 for use in vehicles of a variety of sizes and orientations. Additionally, an eyelet 34' is included to reinforce each of the openings 34.

Figure 7:
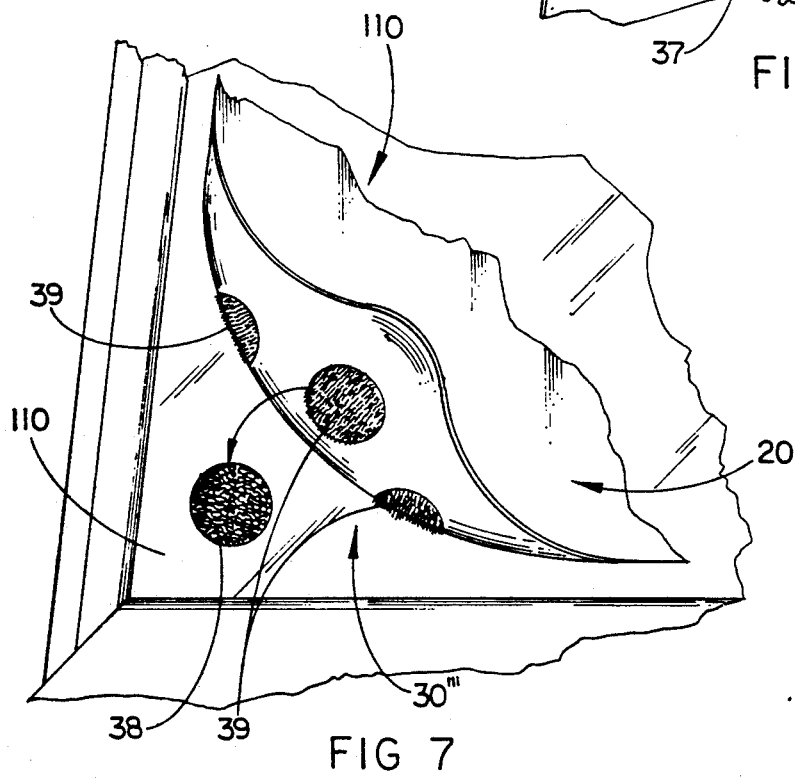
FIG. 7 is a perspective view of a third embodiment of the attachment means.

Finally, as detailed in FIG. 7, alternative attachment means 30''' may be utilized to secure the panel 20 to a windshield 110. Attachment means 30''' includes a hook and loop pad 38 secured to the windshield 110, and a plurality of hook and loop pads 39 disposed in adjustable spaced relation on the panel 20, so as to allow use of the sun shield assembly 10 in a variety of vehicles.

Now that the invention has been described, what is claimed is:

1. To be sued to protect the interior of a vehicle from direct sunlight, a sun shield assembly comprising:
    a flexible, opaque material panel,
    said panel including an upper portion and a lower portion, and being structured and disposed to substantially cover an interior window surface of the vehicle,
    upper attachment means disposed at opposite upper corners of said panel,
    said upper attachment means including a pair of hook and bar assemblies secured to said panel in substantially spaced apart relation from one another, each of said hook and bar assemblies being structured and disposed to hook onto a sun visor assembly of the vehicle,
    each of said hook and bar assemblies including a rigid bar secured at opposite distal ends thereof to said panel, each of said hook and bar assemblies further including a swivelable hook adapted to supportably hook onto the sun visor assembly of the vehicle,
    each of said swivelable hooks being hingedly secured to a sliding cylinder, said sliding cylinder being movably positioned over said rigid bar for movement between said opposite distal ends of said bar such that said and hook and bar assembly is adjustably securable in vehicles of varying sizes and configurations,
    lower attachment means disposed along said lower portion of said panel, said lower attachment means being structured and disposed to be affixed to the inner window surface of the vehicle, and
    said lower attachment means including a plurality of adjustment positions such that said panel may be adjusted to fit over windows of a variety of sizes.

2. A sun shield assembly as recited in claim 1 wherein said lower attachment means includes a plurality of holes in said panel having reinforced eyelets thereon, said holes being spaced to provide a plurality of adjustment positions.

3. A sun shield assembly as recited in claim 2 wherein said lower attachment means further includes a plurality of suction cups removably secured through a desired one of said holes in said panel.

4. A sun shield assembly as recited in claim 3 wherein a plurality of slits are cut into said panel such that the vehicle's rear view mirror passes therethrough and said panel overlies the entire interior surface of the window.

5. A sun shield assembly as recited in claim 1 wherein said lower attachment means includes a plurality of hook and loop fastener pads affixed to said panel and the interior surface of the window.

* * * * *